(12) United States Patent
Cruz et al.

(10) Patent No.: US 12,019,119 B2
(45) Date of Patent: *Jun. 25, 2024

(54) METHODS AND SYSTEMS FOR FAULT INJECTION TESTING OF AN INTEGRATED CIRCUIT HARDWARE DESIGN

(71) Applicant: Imagination Technologies Limited, Kings Langley (GB)

(72) Inventors: Reinald Cruz, Hertfordshire (GB); Habeeb Quazi, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,085

(22) Filed: Jan. 24, 2023

(65) Prior Publication Data
US 2023/0160957 A1  May 25, 2023

Related U.S. Application Data

(63) Continuation of application No. 17/444,095, filed on Jul. 30, 2021, now Pat. No. 11,567,126.

(30) Foreign Application Priority Data

Jul. 30, 2020 (GB) ..................... 2011901

(51) Int. Cl.
*G06F 30/30* (2020.01)
*G01R 31/317* (2006.01)
(52) U.S. Cl.
CPC . *G01R 31/31704* (2013.01); *G01R 31/31707* (2013.01)
(58) Field of Classification Search
CPC ........ G01R 31/31704; G01R 31/31707; G06F 2119/02; G06F 30/3308; G06F 30/34
See application file for complete search history.

(56) References Cited

U.S. PATENT DOCUMENTS 8,122,423 B2   2/2012  Zjajo et al.
10,747,633 B2 * 8/2020  Locker ................... G06F 30/33
(Continued)

FOREIGN PATENT DOCUMENTS

CN     106771962 A    5/2017
GB       2583333 A   10/2020

OTHER PUBLICATIONS

Karaca et al; "Fault grouping for fault injection based simulation of AMS circuits in the context of functional safety"; 13th International Conference on Synthesis, Modeling, Analysis and Simulation Methods and Applications to Circuit Design (SMACD); Jun. 27, 2016; pp. 1-4.

(Continued)

*Primary Examiner* — Jack Chiang
*Assistant Examiner* — Brandon Bowers
(74) *Attorney, Agent, or Firm* — Potomac Law Group, PLLC; Vincent M DeLuca

(57) ABSTRACT

Methods and systems for performing fault injection testing on an integrated circuit hardware design. The methods include: (a) receiving a raw fault node list identifying one or more fault nodes of the hardware design; (b) receiving information indicating a grouping of the fault nodes in the raw fault node list into a plurality of fault node groups, each fault node group comprising fault nodes that have a same effect on a failure mode of the hardware design; (c) generating a final fault node list based on the fault node groups; (d) selecting a set of fault injection parameters from the final fault node list, the set of fault injection parameters identifying at least one fault node in the final fault node list to fault; (e) performing a fault injection test on the hardware design by causing a fault to be injected into a simulation of the hardware design based on the selected set of fault injection parameters; (f) determining a result of the fault (Continued)

injection test; (g) storing the result of the fault injection test; and repeating (d) to (g) at least once.

20 Claims, 8 Drawing Sheets

(56) References Cited

U.S. PATENT DOCUMENTS

2014/0059507 A1    2/2014   Sunter
2016/0334467 A1*   11/2016   Cho ..................... G06F 30/00
2019/0113572 A1    4/2019   Bose et al.

OTHER PUBLICATIONS

Simevski et al; "Automated integration of fault injection into the ASIC design flow"; Oct. 2, 2013; pp. 255-260.
Wu et al; "A Hybrid Approach to Equivalent Fault Identification for Verification Environment Qualification"; May 30, 2018; pp. 447-450.
(Note: NPL in parent apn).

* cited by examiner

| TESTRESULT | FAILURE_MODE | TESTNAME | FNG_ID | FN_ID | ID |
|---|---|---|---|---|---|
| FAULT UNDETECTED | FM2 | TEST1 | FNG_3 | 7 | 1 |
| FAULT UNDETECTED | FM1 | TEST1 | FNG_2 | 66 | 2 |
| FAULT UNDETECTED | FM1 | TEST2 | FNG_4 | 18 | 3 |
| FAULT UNDETECTED | FM3 | TEST3 | FNG_5 | 44 | 4 |
| FAULT UNDETECTED | FM3 | TEST2 | FNG_4 | 23 | 5 |
| FAULT UNDETECTED | FM1 | TEST3 | FNG_2 | 21 | 6 |
| FAULT UNDETECTED | FM3 | TEST2 | FNG_1 | 50 | 7 |
| FAULT UNDETECTED | FM1 | TEST2 | FNG_3 | 42 | 8 |
| FAULT UNDETECTED | FM1 | TEST1 | FNG_3 | 42 | 9 |
| FAULT UNDETECTED | FM2 | TEST3 | FNG_3 | 22 | 10 |
| FAULT UNDETECTED | FM3 | TEST4 | FNG_1 | 20 | 11 |
| FAULT NOT INJECTED | FM2 | TEST4 | FNG_5 | 49 | 12 |
| FAULT UNDETECTED | FM2 | TEST3 | FNG_5 | 19 | 13 |
| FAULT UNDETECTED | FM1 | TEST1 | FNG_5 | 24 | 14 |
| FAULT UNDETECTED | FM2 | TEST2 | FNG_2 | 51 | 15 |
| FAULT UNDETECTED | FM1 | TEST1 | FNG_4 | 28 | 16 |
| FAULT UNDETECTED | FM3 | TEST3 | FNG_2 | 11 | 17 |
| FAULT UNDETECTED | FM2 | TEST4 | FNG_4 | 58 | 18 |
| FAULT NOT INJECTED | FM3 | TEST4 | FNG_2 | 41 | 19 |
| FAULT NOT INJECTED | FM1 | TEST4 | FNG_3 | 12 | 20 |

FIG. 3

| Failure Mode | Fault-Node Group | Test Seeds | % Detected Faults | % Safe Faults | % Pot. Unsafe Faults | % Pot. Unsafe L-Faults | % FNG Coverage | Weight |
|---|---|---|---|---|---|---|---|---|
| FM1 | FNG1 | 1000 | 50% (500) | 10% (100) | 35% (350) | 5% (50) | 60% | 1 |
| | FNG2 | 1000 | 10% (100) | 30% (350) | 25% (350) | 35% (350) | 40% | 5 |

FIG. 4

```
// CHECKSUM: "2393764454 1689662352"
//
// ANNOTATION: "ModuleName: PVRLIB_IMG_ROUND_ROBIN_INDEX_ARCH1 RTL (genericWIDTH = 4, HOLD_PREVIOUS=0) "
// INSTANCE: rgx_tdm_tb_top.u_dut.i_RGX_TDM_CONTROL.i_IMG_ROUND_ROBIN_INDEX_ARCH1_MISSION_ENABLED_CLUSTERS
//
// ANNOTATION: "FileName: ... /img_round_robin_inex_arch1.vhd, LineNumber: 37"
//Toggle VALIDS "reg VALIDS[3:0]"
//
// ANNOTATION: "FileName: ... /img_round_robin_inex_arch1.vhd, LineNumber: 39"
//Toggle PREVIOUS_INDEX "reg PREVIOUS_INDEX[1:0]"
//
// ANNOTATION: "FileName: ... /img_round_robin_inex_arch1.vhd, LineNumber: 40"
//Toggle NEXT_INDEX "reg NEXT_INDEX[1:0]"
//
// ANNOTATION: "FileName: ... /img_round_robin_inex_arch1.vhd, LineNumber: 46"
//Toggle FAIL_SIGNAL "reg FAIL_SIGNAL[0:0]"
//
// ANNOTATION: "FileName: ... /img_round_robin_inex_arch1.vhd, LineNumber: 52"
//Toggle ASSERT_INPUTS_OK "reg ASSERT_INPUTS_OK"
//
// ANNOTATION: "FileName: ... /img_round_robin_inex_arch1.vhd, LineNumber: 53"
//Toggle ASSERT_INDEX_LESS_THAN_WIDTH "reg ASSERT_INDEX_LESS_THAN_WIDTH"
//
// ANNOTATION: "FileName: ... /img_round_robin_inex_arch1.vhd, LineNumber: 54"
//Toggle ASSERT_PREV_INDEX_DISABLE "reg ASSERT_PREV_INDEX_DISABLE"
```

FIG. 5

METHODS AND SYSTEMS FOR FAULT INJECTION TESTING OF AN INTEGRATED CIRCUIT HARDWARE DESIGN

CROSS-REFERENCE TO RELATED APPLICATIONS AND CLAIM OF PRIORITY

This application is a continuation under 35 U.S.C. 120 of application Ser. No. 17/444,095 filed Jul. 30, 2021, now U.S. Pat. No. 11,567,126, which claims foreign priority under 35 U.S.C. 119 from United Kingdom Application No. 2011901.2 filed Jul. 30, 2020.

BACKGROUND

Generating an integrated circuit (IC) generally comprises developing an integrated circuit hardware design which describes the structure and/or function of the integrated circuit; iteratively testing an instantiation of the hardware design and modifying the design based on the testing; and manufacturing an integrated circuit based on the hardware design.

In general, a failure in an instantiation of a hardware design can arise from a systematic fault or a random fault. Systematic faults are faults that occur in a deterministic way. These faults are often caused by errors in the hardware design itself or manufacturing of the hardware. Systematic faults are normally identified using techniques designed to test the functionality of the hardware design against the specification for the design, such as simulation-based verification and formal property verification. In contrast, random faults are unpredictable faults that occur during the operation of an instantiation of the hardware design. Random faults are classified into permanent faults (e.g. faults that, once manifested, do not go away), which may also be referred to as hard errors; and transient faults (e.g. faults that exists for a short time), which may also be referred to as soft errors. A hardware design may implement one or more safety mechanisms which are configured to detect such faults and, if detected, place the instantiation of the hardware design in a safe state and/or inform the instantiation that a fault has occurred. How a hardware design deals with random faults is often tested via fault injection testing. Fault injection testing is a testing technique in which faults are deliberately introduced into the system or device under test to determine how the system or device responds to such faults. Fault injection testing may be used to assess the robustness of the hardware design to random faults and to verify that the safety mechanisms (and the safety logic that implements those mechanisms) work as expected.

When doing fault injection testing, it is desirable to mimic the fault occurrence as close to real-world silicon as possible. However, doing fault injection testing in silicon or in a field programmable gate array (FPGA) is not only time consuming and expensive, but it is also extremely difficult to debug and reproduce. Accordingly, fault injection testing is normally performed at gate-level (e.g. via gate-level simulation (GLS)) by injecting errors into synthesized netlists.

The embodiments described below are provided by way of example only and are not limiting of implementations which solve any or all of the disadvantages of known methods and systems for fault injection testing of an integrated circuit hardware design.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and systems for performing fault injection testing on an integrated circuit hardware design. The methods include: (a) receiving a raw fault node list identifying one or more fault nodes for the hardware design; (b) receiving information indicating a grouping of the fault nodes in the raw fault node list into a plurality of fault node groups, each fault node group comprising fault nodes that have a same effect on a failure mode of the hardware design; (c) generating a final fault node list based on the fault node groups; (d) selecting a set of fault injection parameters based on the final fault node list, the set of fault injection parameters identifying at least one fault node in the final fault node list to fault; (e) performing a fault injection test on the hardware design by causing a fault to be injected into a simulation of the hardware design based on the selected set of fault injection parameters; (f) determining a result of the fault injection test; (g) storing the result of the fault injection test; and repeating (d) to (g) at least once.

A first aspect provides a computer-implemented method of performing fault injection testing on an integrated circuit hardware design, the method comprising: (a) receiving a raw fault node list identifying one or more fault nodes of the hardware design; (b) receiving information indicating a grouping of the one or more fault nodes in the raw fault node list into a plurality of fault node groups, each fault node group comprising fault nodes that have a same effect on a failure mode of the hardware design; (c) generating a final fault node list based on the fault node groups; (d) selecting a set of fault injection parameters based on the final fault node list, the set of fault injection parameters identifying at least one fault node in the final fault node list to fault; (e) performing a fault injection test on the hardware design by causing a fault to be injected into a simulation of the hardware design in accordance with the selected set of fault injection parameters; (f) determining a result of the fault injection test; (g) storing the result of the fault injection test; and repeating (d) to (g) at least once.

Selecting a set of fault injection parameters may comprise selecting a fault node group of the plurality of fault node groups and selecting one or more fault nodes from the selected fault node group.

The one or more fault nodes of the selected fault node group may be selected such that fault nodes of the selected fault node group that have not been selected for a fault injection test are more likely to be selected than fault nodes of the selected fault node group that have already been selected for a fault injection test.

Selecting a set of fault injection parameters may further comprise determining from the results of the fault injection tests which fault nodes of the selected fault node group have not yet been selected for a fault injection test and randomly selecting one of the fault nodes of the selected fault node group which has not yet been selected for a fault injection test.

The fault node group of the plurality of fault node groups may be selected such that the fewer times a fault node group has been selected for a fault injection test the more likely the fault node group is to be selected.

Selecting a set of fault injection parameters may further comprise determining, from the results of the fault injection tests, which of the fault node groups of the plurality of fault node groups have been selected for a fault injection test a fewest number of times and randomly selecting one of the fault node groups that have been selected for a fault injection test the fewest number of times.

When the fault injection test is a single point fault test, selecting one or more fault nodes from the selected fault node group may comprise selecting a single fault node from the selected fault node group.

Each fault node group may be associated with a failure mode. Each failure mode may be associated with a safety mechanism that is implemented in the hardware design. When the fault injection test is a dual point fault test, selecting one or more fault nodes of the selected fault node group may comprise selecting a first fault node of the selected fault node group that forms part of safety logic that implements the safety mechanism for the associated failure mode and a second fault node that does not form part of the safety logic that implements the safety mechanism for the associated failure mode.

Selecting a set of fault injection parameters may further comprise selecting one or more of: a time at which the fault is to be injected, a duration of the fault, and whether the fault is a 0 or a 1.

The method may further comprise generating the raw fault node list from toggle coverage information for a simulation of the hardware design.

The toggle coverage information may identify one or more toggle elements and generating the raw fault node list from the toggle coverage information may comprise adding each toggle element identified in the toggle coverage information to the raw fault node list as a fault node.

The method may further comprise generating the toggle coverage information from a simulation of the hardware design.

Each fault node in the raw fault node list may form part of none, one or more than one fault node group, and generating the final fault node list from the fault node groups may comprise adding each fault node that forms part of at least one fault node group to the final fault node list.

The final fault node list may comprise an entry for each fault node in the final fault node list, each entry in the final fault node list may comprise information identifying a fault node and information identifying one or more fault node groups that the fault node forms part of.

Each failure mode may be associated with a safety mechanism that is implemented in the hardware design, and each entry in the final fault node list may further comprise information identifying the failure mode associated with the one or more fault node groups that the fault node forms part of and/or for each fault node group that the fault node forms part of information indicating whether the fault node forms part of safety logic that implements the safety mechanism for the failure mode associated with that fault node group.

The method may further comprise causing the simulation to stop when one of a plurality of simulation stop conditions occurs during the simulation.

The plurality of simulation stop conditions may comprise one of more of: an error occurring in the simulation after the fault is injected therein; a safety mechanism implemented by the hardware design detecting the fault; and a predetermined number of cycles elapsing since the fault was injected into the simulation.

Determining the result of a fault injection test may comprise analysing a fault injection test log generated during the simulation.

Each fault injection test may be associated with a failure mode. Each failure mode may be associated with a safety mechanism that is implemented in the hardware design. Determining the result of a fault injection test may comprise determining if, after the fault was injected into the simulation, the safety mechanism associated with the fault injection test detected the fault and determining if, after the fault was injected into the simulation an error occurred in the simulation.

The method may further comprise generating one or more safety metrics from the results of the fault injection tests.

The integrated circuit hardware design may be a register transfer level hardware design.

Processing the integrated circuit hardware design at an integrated circuit manufacturing system may cause the integrated circuit manufacturing system to generate an integrated circuit.

A second aspect provides a system to perform fault injection testing on an integrated circuit hardware design, the system comprising: a fault node grouping module configured to: receive a raw fault node list identifying one or more fault nodes of the hardware design; receive information indicating a grouping of the fault nodes in the raw fault node list into a plurality of fault node groups, each fault node group comprising fault nodes that have a same effect on a failure mode of the hardware design; and generate a final fault node list based on the fault node groups; a fault selector configured to, for each of a plurality of fault injection tests, select a set of fault injection parameters based on the final fault node list, the set of fault injection parameters identifying at least one fault node in the final fault node list to fault; a fault injector configured to, for each of the plurality of fault injection tests, cause a fault injection test to be performed on the hardware design by causing a fault to be injected into a simulation of the hardware design in accordance with the selected set of fault injection parameters; and a log parser configured to, for each of the plurality of fault injection tests, determine a result of the fault injection test and store the result of the fault injection test.

There may be provided a method of manufacturing, at an integrated circuit manufacturing system, an integrated circuit from an integrated circuit hardware design tested in accordance with a method and/or system described herein. There may be provided an integrated circuit hardware design that has been tested in accordance with a method and/or system described herein that, when processed in an integrated circuit manufacturing system, configures the system to manufacture an integrated circuit. There may be provided a non-transitory computer readable storage medium having stored thereon an integrated circuit hardware design that has been tested in accordance with a method and/or system described herein that, when processed in an integrated circuit manufacturing system, causes the integrated circuit manufacturing system to manufacture an integrated circuit.

There may be provided an integrated circuit manufacturing system comprising: a non-transitory computer readable storage medium having stored thereon an integrated circuit hardware design that has been tested in accordance with a method and/or system described herein; a layout processing system configured to process the integrated circuit hardware design so as to generate a circuit layout description of an integrated circuit; and an integrated circuit generation system configured to manufacture the integrated circuit according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 3 is a schematic diagram illustrating part of an example fault injection test record;

FIG. 4 is a schematic diagram illustrating example metrics that can be generated from the fault injection test record;

FIG. 5 is a schematic diagram illustrating part of an example toggle coverage report;

Figure 1:
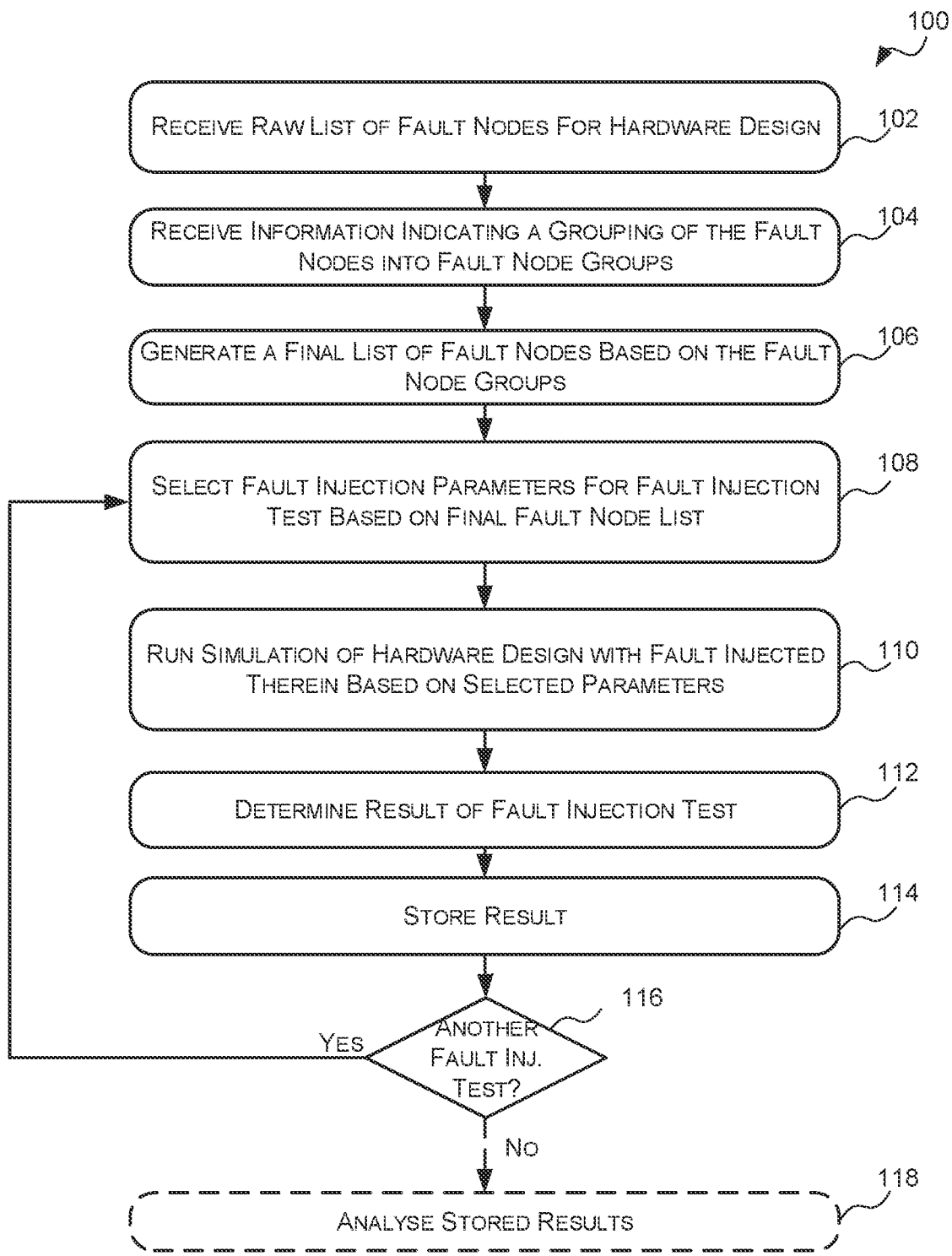
FIG. 1 is a flow diagram of an example method of performing fault injection testing on an integrated circuit hardware design.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Existing tools and methods for performing fault injection testing on an integrated circuit hardware design have a number of disadvantages such as, but not limited to, lack of customisation and limited support for register transfer level (e.g. VHDL) level testing. Furthermore, for complex hardware designs, such as, but not limited to, graphics processing units (GPUs), it is often unrealistic and impractical to test all possible fault nodes (i.e. elements of the hardware design, such as, but not limited to signals and ports, which can be faulted during simulation thereof). This is not only due to the high number of fault nodes in such hardware designs, and the simulation time associated therewith, but verification engineers also generally have a limited number of resources at their disposal. Accordingly, fault injection testing for complex hardware designs is often performed for a random selection of fault nodes. Therefore, to efficiently perform fault injection testing it is desirable that the fault nodes that are faulted in the fault injection tests be selected in a manner that minimizes the number of tests required to achieve the fault injection testing goal.

Accordingly, described herein are methods and systems for simulation-based fault injection testing of an integrated circuit hardware design in which the fault nodes are grouped into fault node groups, and the fault node(s) to be faulted in each fault injection test of fault campaign is/are selected based on the grouping of the fault nodes. As described in more detail below, a fault node group is a group of fault nodes that have the same effect on a failure mode to be tested. As is known to those of skill in the art, a failure mode is the manner in which a failure occurs, or the manner by which a failure is observed. In contrast to the cause of a failure, a failure mode describes the way a failure occurs. The failure modes of a hardware design may be identified by, for example, using a Failure Mode and Effects Analysis (FMEA) technique, or procedure, and the failure modes to be tested may be selected based on the safety goals.

Sorting the fault nodes into fault node groups, and selecting the fault node(s) to fault in any fault injection test based on the fault node groups, may reduce the number of fault injection tests that need to be performed to ensure that all of the failure modes are adequately tested. Other benefits of the described methods and systems include, but are not limited to, that they can be used to verify a register-transfer level hardware design or a gate-level hardware design (e.g. a netlist); and they are customisable.

Reference is now made to FIG. 1 which illustrates an example method 100 of performing fault injection testing on an integrated circuit hardware design in which the fault nodes of the hardware design are grouped into fault node groups. All or a portion of the method 100 may be implemented by a computing-based device, such as the computing-based device 700 described below with respect to FIG. 7. For example, there may be a computer readable storage medium having stored thereon computer readable instructions that, when executed at a computing-based device, cause the computing-based device to perform all or a portion of the method 100 of FIG. 1.

An integrated circuit hardware design, which may be referred to herein simply as a hardware design, is a description of the structure and/or function of an integrated circuit which, when processed at an integrated circuit manufacturing system, causes the integrated circuit manufacturing system to generate an integrated circuit described by the hardware design. For example, as described in more detail below with respect to FIG. 8, when an integrated circuit hardware design is processed at an integrated circuit manufacturing system the integrated circuit manufacturing system may generate an integrated circuit by synthesizing the hardware design into silicon, or, by loading configuration data into a field-programmable gate array (FPGA).

A hardware design may be implemented in a high-level hardware description language (HDL), such as, but not limited to, a register transfer level (RTL) language. Examples of register transfer level languages include, but are not limited to, VHDL (VHSIC Hardware Description Language) and Verilog®. It will be evident to a person of skill in the art that other high-level hardware description languages may be used such as proprietary high-level hardware description languages.

An instantiation of a hardware design is a representation of the hardware and/or functionality of the hardware defined by the hardware design. An instantiation of a hardware design includes, but is not limited to, an emulation model of the hardware design that simulates the behaviour of the hardware defined by the hardware design, a synthesized version (e.g. netlist) of the hardware design, a hardware implementation (e.g. integrated circuit or a field-programmable gate array (FPGA)) of the hardware design, and a mathematical model of the hardware design generated by a formal verification tool. An instantiation of the hardware design embodies the hardware design in a form which can be tested to verify the hardware design.

The method 100 begins at block 102 where a raw list of fault nodes in the hardware design is received. A fault node is an element of the hardware design under test, such as, but not limited to, a signal or port, in which a fault can be introduced. The raw list of fault nodes may include a comprehensive list of the fault nodes in the hardware design. The raw list of fault nodes for the hardware design may be generated in any suitable manner. For example, as described in more detail below, in some cases, the raw fault node list may be generated from toggle coverage information generated by a simulation tool for a simulation of the hardware design. Once the raw fault node list has been received the method 100 proceeds to block 104.

At block 104, information identifying a grouping of the fault nodes in the raw fault node list into fault node groups is received. The grouping is based on the failure modes of the hardware design to be tested. As described above, a failure mode is the manner in which a failure occurs, or the manner by which a failure is observed. In contrast to the cause of a failure, a failure mode describes the way a failure occurs. An example failure mode is an adder incorrectly executing an add instruction caused by a fault in the adder. The failure modes for a hardware design may been identified in any suitable manner. For example, in some cases, the failure modes of a hardware design may be identified through a technique, or process, called Failure Mode and Effects Analysis (FMEA). As is known to those of skill in the art, FMEA is a technique or process performed to understand and explore the way in which a device or product can fail and the associated effects and/or outcome in the event of a failure. The steps performed in an FMEA process may vary depending on the product or device; and a company's quality processes. After performing FMEA it is understood what failure modes a product or device has and what safety mechanisms can be added to protect against each failure mode, and its effect in the system.

The set of failure modes to be tested may be based on the safety goals and safety case development. For example, the failure modes to be tested may be those failure modes that will lead to a violation of a safety goal. A safety goal is a top-level safety requirement that is assigned to a system, with the purpose of reducing the risk of one or more hazardous events. A hazardous event is an event which may result in harm and/or one or more other undesirable outcomes. What constitutes a hazardous event may depend on the purpose or use of the integrated circuit. For example, a hazardous event for an integrated circuit that is configured to control an aspect of a motor vehicle may be an event which may lead to an accident if not controlled in a timely manner.

Figure 2:
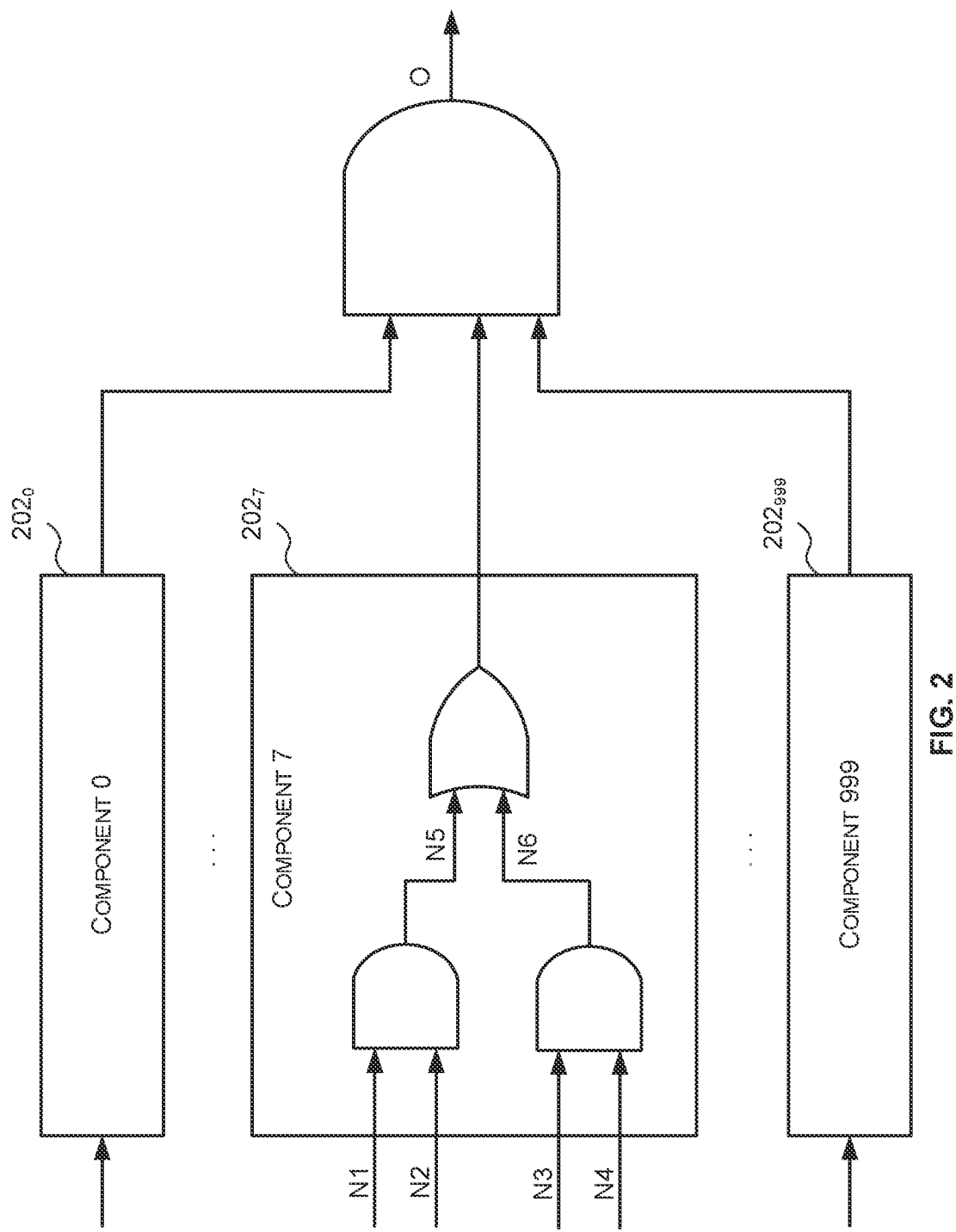
FIG. 2 is a schematic diagram illustrating an example of fault node grouping.

A fault node group is a set of one or more fault nodes that provide the same effect with respect to a failure mode. For example, let output O of FIG. 2 be where a failure is observed. In this example, a fault in any of nodes N1 to N4 of each of components 0 to 999 $202_0$-$202_{999}$ will have the same effect on the output O and thus nodes N1 to N4 for each component can belong to the same fault node group. In some cases, the fault nodes in the raw fault node list may grouped into fault node groups manually. Accordingly, the information identifying the grouping of the fault nodes in the raw fault node list into fault node groups may be generated by and/or input by a user (e.g. verification engineer) using, for example, a graphical user interface (GUI).

Each fault node in the raw fault node list may belong to none, one or more than one fault node group. For example, if a fault node in the raw fault node list does not have an effect on any of the failure modes to be tested, that fault node may not belong to any fault node groups. This means that it is possible that some of the fault nodes in the raw fault node list may not belong to any of the fault node groups. In contrast, if a fault node in the raw fault node list has an effect on, or is related to, more than one failure mode then the fault node may belong to multiple fault node groups.

The fault nodes that have an effect on a failure mode may be identified from the failure mode and the safety mechanism implemented to address the failure mode. For example, if the failure mode is random access memory (RAM) data corruption and the associated safety mechanism is error detection and correction (such as ECC), the fault nodes corresponding to control logic or control paths may not be relevant to the failure mode, whereas fault nodes corresponding to data or data paths may be relevant to the failure mode. Similarly, the fault nodes that have the same effect on a failure mode may be identified from the failure mode and the safety mechanism to address the failure mode. For example, if the safety mechanism for a failure mode is a parity check on the output of specific pipelined data, it will be evident that corruption of the data at any pipeline stage will have the same effect on the failure mode. Once information identifying the grouping of fault nodes into fault node groups has been received the method 100 proceeds to block 106.

At block 106, a final fault node list is generated from the raw fault node list received in block 102 and the fault node groups identified in block 104. In some cases, the final fault node list may include all of the fault nodes that belong to one of the fault node groups (i.e. all of the fault nodes that effect, or are related to, a failure mode to be tested). Since not all of the fault nodes in the raw fault node list may belong to a fault node group, the final fault node list may comprise a subset of the fault nodes in the raw fault node list. The term "subset of X" is used herein to mean less than all of the elements of X. Accordingly, a subset of the fault nodes in the raw fault node list comprises less fault nodes than the raw fault node list.

The final fault node list may comprise an entry for each fault node therein that identifies the fault node and identifies the fault node group(s) to which it belongs. Table 1 shows an example final fault node list that comprises five fault nodes. In some cases, as shown in Table 1, the information identifying a fault node may comprise a full path to the fault node in the hardware design. The full path may comprise the full hierarchical path of a fault node in the hardware design. For example, if the top level of a hardware design is A, and it has a sub-module B, and inside the sub-module there is a register Z which is identified as a fault node, the full path to the fault node in the hardware design may be described as A.B.Z. However, it will be evident to a person of skill in the art that this is an example only and that the format for the full path to a fault node in the hardware design may be different for different simulation tools and different hardware designs. A fault node group may be identified in the final fault node list in any suitable manner. For example, each fault node group may be assigned a unique identifier, such as a number, and the fault node group may be identified by that unique identifier.

TABLE 1

| Fault Node ID | Fault Node Path | Fault Node Group(s) | Failure Mode(s) | Mission Logic/ Safety Logic |
|---|---|---|---|---|
| 1 | A.B.V | FNG_1 | FM1 | M |
| 2 | A.C.W | FNG_1 | FM1 | S |
| 3 | A.B.X | FNG_2 | FM2 | M |
| 4 | A.D.Y | FNG_3 | FM1 | M |
| 5 | A.B.Z | FNG_2 | FM2 | S |

In some cases, one or more fault node entries in the final fault node list may also comprise additional information. For example, as shown in Table 1, each fault node in the final fault node list may be assigned a unique ID (e.g. a unique number) and each fault node entry may comprise information identifying the unique ID for the fault node. In some cases, as shown in Table 1, each fault node entry may comprise, for each failure mode that the fault node is associated with, information identifying whether the fault node forms part of mission or safety logic with respect to that failure mode. Mission logic is defined as any logic within the hardware design under test that contributes to its functional operation. In contrast, safety logic is logic within the hardware design under test that contributes to, or implements, a safety mechanism.

A safety mechanism is a technological solution implemented by E/E functions or elements, or other technologies, to detect faults and/or to control failures to achieve or maintain a safe state. Example safety mechanisms include error correction code (ECC), cyclic redundancy check (CRC), hardware redundancy, and built-in-self-test (BIST). A safety mechanism is implemented by safety logic. An example of safety logic is described in the Applicant's UK Patent Application No. 1617530.9. In that example the safety logic is configured to detect when an out-of-bounds memory access occurs in a processor of the device and, if an out-of-bounds violation is detected, transition the device to a safe state.

In some cases, the final fault node list may be stored in a comma separated value (CSV) format to allow the final fault node list to be easily parsed or analysed in subsequent blocks of the method. However, it will be evident to a person of skill in the art that this is an example only, and that the final fault node list may be in any suitable format. In some cases, the final fault node list may be published to make it available to other components.

Once the final fault node list has been generated the method 100 proceeds to block 108 where the fault injection testing begins.

At block 108, the parameters for a fault injection test are selected based on the final fault node list generated at block 106. Selecting the parameters for a fault injection test may comprise: (i) randomly, or pseudo randomly, selecting a fault node group; (ii) randomly, or pseudo randomly, selecting one or more fault nodes in the selected fault node group; and (iii) randomly, or pseudo randomly, selecting one or more fault parameters such as, but not limited to, the time of the fault injection, the length of the fault injection (e.g. in clock cycles), and whether faulting a fault node sets the fault node to a "1" or a "0". In some cases, a length of zero may indicate an infinite fault (i.e. a permanent fault).

The number of fault nodes that are selected from the selected fault node group may be based on the type of fault test—e.g. whether the test is a single point fault test or a multi point fault test. As is known to those of skill in the art, for a single point fault test a single fault node is faulted and for a multi-point fault test multiple distinct fault nodes are faulted. Accordingly, for a single point fault test, one fault node in the selected fault node group may be selected. In contrast, for a dual point fault test two fault nodes in the selected fault node group are selected. In some cases, for a dual point fault test, one fault node that forms part of the mission logic may be selected and one fault node that forms part of the safety logic may be selected. The type of fault test may be selected based on a number of factors such as, but not limited to, the intent and/or goal(s) of the fault injection campaign which may be based on, for example, an FMEA process, a safety plan and/or a safety goal.

Where the final fault node list is in a CSV, or similar format, the fault nodes in the fault node list may be easily sorted based on fault node group in the same manner that one would be able to sort a Microsoft Excel spreadsheet based on a particular column.

In some cases, the random, or pseudo random, selection of a fault node group may be controlled (or may be controllable) so as to prevent the same fault node group being selected over and over again to the exclusion of one or more other fault node groups. Specifically, in some cases, the fault node group selection may be performed in such a way that preference is given to fault node groups that have not yet been tested. For example, as described in more detail below, a record of the fault injection tests performed may be maintained which indicates which fault node group was tested in each fault injection test. In these cases, a set of candidate fault node groups may be generated from the record of fault injection tests. Then, a fault node group may be randomly selected from the set of candidate fault nodes groups. In some cases, the set of candidate fault node groups may comprise the fault node groups with the lowest number of fault injection tests according to the record of fault injection tests. Where there is at least one fault node group that has not been tested then the set of candidate fault node groups may comprise all the fault node groups that have not been tested.

Similarly, in some cases, the random, or pseudo random, selection of a fault node in a selected a fault node group may be controlled (or may be able to be controlled) so as to prevent the same fault node being selected many times to the exclusion of other fault nodes in the same fault node group. Specifically, in some cases, the selection of a fault node in a selected fault node group may be performed in such a way that preference is given to fault nodes in the selected fault node group that have not yet been tested. For example, as described in more detail below, a record of the fault injection tests performed for a fault campaign may be maintained which indicates which fault node(s) was/were tested in each fault injection test. In these cases, a set of candidate fault nodes in the selected fault node group may be generated from the record of fault injection tests. Then, a fault node may be randomly selected from the set of candidate fault nodes. In some cases, the set of candidate fault nodes may comprise the fault nodes in the selected fault node group associated with the lowest number of fault injection tests according to the record of fault injection tests. Where there is at least one fault node in the selected fault node group that has not been tested then the set of candidate fault node groups may comprise all the fault nodes in the selected fault node group that have not been tested.

In some cases, once the fault injection test parameters have been selected, a random fault node packet, or simply a fault node packet, may be generated which identifies the selected parameters for a fault injection test. The fault node packet may then be transmitted to the test bench which may trigger a fault injection test to be performed based on the identified parameters. Once the parameters for a fault injection test have been selected the method 100 proceeds to block 110.

At block 110, a simulation of the hardware design is run in which a fault, in accordance with the parameters selected in block 108, is injected into the simulation. The technique of injecting a fault into a simulation of a hardware design is referred to as simulation-based fault injection. A simulation run with a fault injected therein may be referred to herein as a fault injection simulation.

As is known to those of skill in the art, during simulation of a hardware design the behaviour of the hardware design in response to stimuli is mimicked. Simulation can be performed at different levels of abstraction, such as, at the register transfer level, at the gate level (e.g. gate level simulation (GLS)), or power-aware GLS where some of the physical characteristics relating to how the logic consumes power is simulated. As described in more detail below with respect to FIG. 6, simulation of a hardware design is often performed using a simulation tool and a test bench.

A simulation tool is a software tool configured to mimic the behaviour of a hardware design in response to stimuli. In some cases, different tools may be used to simulate hardware designs at different levels of abstraction—e.g. some simulation tools may be configured to perform register transfer level simulation and other tools may be configured to perform gate level simulation. RTL simulation operates as if the integrated circuit described by the hardware design is operating in an ideal world, without any physical or electromagnetic properties taken into account. In other words, in RTL simulation the logic is simulated as per its operation as flip-flops.

A test bench describes the environment in which a hardware design is simulated. A test bench may identify: the hardware design under test, a reference model of the hardware design under test (e.g. a C model of the hardware design), the stimuli to be applied to the hardware design and the reference model, and the elements (e.g. signals, registers etc.) of the hardware design to be monitored (e.g. sampled) during the simulation. A test bench may be implemented by a set of commands or code which, when executed by a simulation tool, causes the simulation tool to instantiate the hardware design and the reference model and provide specified stimuli to the hardware design and the reference module. The commands that are used to identify or specify the stimuli vary with the simulation tool. In some cases, the test bench may comprise or define a plurality of different sets of stimuli each of which is referred to as a test and one set of stimuli, or test, may be selected for use during the simulation.

In simulation-based fault injection a fault is injected into the simulation so as to be able to test the hardware design's response to the fault. There are two types of simulation-based fault injection: run-time fault injection and compile-time fault injection. In run-time fault injection, faults are injected during the simulation. In compile-time fault injection, faults are injected at compile-time in the hardware design. In the examples described herein the fault is injected at run-time. In other words, during the simulation the simulation tool adjusts, or faults, one or more fault nodes (e.g. changes the fault node from a "1" to a "0" or vice versa). One of the benefits of run time fault injection is that, in contrast to many known fault injection tools which mutate the hardware design under test to inject a fault therein, the hardware design under test is not modified.

In the examples described herein a fault is injected into the simulation in accordance with the fault injection parameters selected in block 108. Specifically, a fault is introduced in the selected fault node(s) in accordance with the selected fault parameters (e.g. at the selected time, for the selected duration, and in the selected manner).

To be able to inject a fault into the simulation the test bench may also comprise a fault injector which is configured to receive information identifying the fault injection test parameters selected in block 108 (e.g. a fault packet) and cause a fault to be injected into the simulation in accordance with the identified parameters. The fault injector may be able to cause a fault to be injected into a simulation by generating instructions or commands, which, when executed by the simulation tool, cause the simulation tool to inject a fault into one or more desired fault nodes. The commands may identify the node(s) to be faulted, the time the node(s) is/are to be faulted, the length of the fault and how the node(s) is/are to be faulted (e.g. set to '0' or '1').

For example, where the simulation is at a register transfer level, the fault injector may be configured to use known commands such as "deposit" or "force", which when executed by an RTL simulation tool cause the simulation tool to inject a fault into the simulation. Specifically, a force command is a simulation command, which when executed by a simulation tool, causes the simulation tool to override a specified item (e.g. signal) with a specified value until a release command is executed. Executing a force command is akin to a hacker overriding the CCTV footage seen by a security officer with a fake video stream until the hacker switches it back to the original feed. In contrast, a deposit command, when executed by a simulation tool, causes the simulation tool to replace a specified item (e.g. signal) with a specified value for one clock cycle without overriding the logic that drives the item in subsequent cycles. For example, if a counter is initialised to zero and is incremented on a known event. Then after 100 occurrences of the known event the counter will be incremented to 100. If the counter has been deposited a value of 15 before any of the known events occur, then after 100 occurrences of the known event the counter will be incremented to 115. The fault node to be faulted may be identified in the command(s) by its location (e.g. full hierarchical path).

The test bench may also comprise commands or code which, when executed by a simulation tool cause the simulation tool to detect errors that occur during the simulation. This section of the test bench may be referred to as defining checkers and/or scoreboards. In some cases, an error may be detected by comparing one or more signals, registers and/or ports of the hardware design with one or more features of the reference model. For example, in some cases, the test bench may cause the simulation tool to compare the outputs of the hardware design in response to the stimuli to the outputs of the reference model in response to the stimuli, and determine that there is an error if the outputs do not match. As the fault is injected into the simulation of the hardware design, but is not injected into the reference model, if the hardware design and the reference model produce the same outputs, even in light of the fault, the fault may be considered a safe fault as it did not affect the output.

As is known to those of skill in the art, there are multiple ways in which an error that occurs during simulation may be detected. For example, an error that occurs during simulation may be detected via one or more assertions. As is known to those of skill in the art an assertion is a statement which identifies a property of the hardware design that must be true. A property identified by an assertion is said to be an asserted property. An assertion statement, when executed by a simulation tool, causes the simulation tool to monitor the identified property during a simulation to determine if the property is true. If the simulation tool determines at any point during the simulation that the property is not true, then the assertion fails.

The test bench may also comprise commands or code which specify when, after the fault is injected into the simulation, the simulation is to stop. In other words, the test bench may specify one or more simulation stop conditions. The simulation stop conditions may include, after the fault has been injected into the simulation: (i) the relevant safety mechanism (i.e. the safety mechanism associated with failure mode being tested) detecting the fault; (ii) a fatal and/or non-fatal error occurring during the simulation; and/or (iii) a certain number of cycles (e.g. clock cycles) elapsing. One or more of the stop conditions may be dependent on the fault injection test parameters selected in block 108. For example, the relevant safety mechanism will be based on the failure mode being tested. Accordingly, one or more of the simulation stop conditions may be generated in response to receiving information (e.g. a fault packet) identifying the fault injection test parameters selected in block 108.

The test bench may also comprise commands or code which, when executed by a simulation tool, cause the simulation tool to generate a fault injection test log which includes information on events etc. that occurred during the simulation. In some cases, the test bench may cause the simulation tool to generate a fault injection test log that comprises information identifying what errors were detected during the simulation, information identifying whether or not the relevant safety mechanism detected the fault, and/or the reason the simulation was stopped.

Once the faut injection test has ended (i.e. the simulation has been stopped) the method 100 proceeds to block 112. The simulation may have stopped, for example, because a simulation stop condition specified in the test bench was identified by the simulation tool during the simulation; or the simulation tool detected an error or another condition with the simulation which caused the simulation tool to stop the simulation.

At block 112, a result of the fault injection test is determined. In some cases, the fault injection test log is analysed to determine the result of the test. As described above, the fault injection test log may comprise information identifying what errors were detected during the simulation, information identifying whether or not the relevant safety mechanism detected the fault, and/or the reason the simulation was stopped. The result of the fault injection test may be based on: whether the fault was detected by a safety mechanism/safety logic during the simulation; whether an error occurred as a result of the fault; and/or whether no error occurred, and the simulation was stopped for another reason (e.g. timeout).

For example, in some cases, the result of the fault injection test may be determined to be one of: DETECTED FAULT, SAFE FAULT, POTENTIALLY UNSAFE FAULT, or POTENTIALLY UNSAFE LOCKUP FAULT. Specifically, the result of the fault injection test may be determined to be: DETECTED FAULT if the relevant safety mechanism/safety logic detected the fault during the simulation; SAFE FAULT if the relevant safety mechanism/safety logic did not detect the fault during the simulation, but none of the errors set out in the test bench were identified during the simulation (e.g. the output of the hardware design matched the output of the reference model); POTENTIALLY UNSAFE FAULT if the relevant safety mechanism/safety logic did not detect the fault during the simulation, but at least one of the errors set out in the test bench were identified during the simulation (e.g. the output of the hardware design did not match the output of the reference model); and POTENTIALLY UNSAFE LOCKUP FAULT if the safety mechanism/safety logic did not detect the fault during simulation and the simulation did not progress to completion due to, for example, a timeout condition specified by the simulation tool itself or the test bench being reached. It will be evident to a person of skill in the art that these are examples only, and that in other examples there may be fewer, more and/or different types of results. For example, in other cases, the result of the fault injection test may simply be PASS or FAULT DETECTED if the fault is detected by the safety mechanism, FAIL or FAULT UNDETECTED if the fault is not detected by the safety mechanism, or FAULT NOT INJECTED if the fault was not injected into the simulation (e.g. because a simulation error occurred).

In some cases, the determination of the result of the fault injection test may be implemented by a software program, code or script, which may be referred to below as a log parser, which is configured to search the fault injection log for information (e.g. a signature) indicating what, if any, errors were detected during the simulation, and for information indicating whether the fault was detected by the relevant safety mechanism. The software program, code, or script may then be configured to determine the result of the fault injection test based on the located information. Once the result of the fault injection test has been determined the method 100 proceeds to block 114.

At block 114, the result of the fault injection test is stored (e.g. in memory). In some cases, the result of the fault injection test may be stored in a fault injection test record (which may also be referred to as a record of fault injection tests). In some cases, there may be an entry in the record for each fault injection test performed during the fault campaign. In these cases, storing the result of the fault injection test may comprise adding an entry to the fault injection test record indicating the result of the most recent fault injection test. Each entry may also comprise other information describing the fault injection test such as, but not limited to, the fault node(s) that were faulted, the fault node group that the fault node(s) belong to, the failure mode that the fault node group relates to, and/or the set of stimuli (e.g. the test) used for the simulation etc.

Reference is now made to FIG. 3 which illustrates an excerpt of an example fault injection test record 300. In the example of FIG. 3, each line of the fault injection test record 300 corresponds to an entry of the fault injection test record, and provides information on a specific fault injection test. It can be seen that each entry comprises information identifying: the results of the fault injection test; the failure mode that was tested; the set of stimuli (e.g. test) that was used during the simulation; the fault node group that was tested, and the specific fault node that was faulted. It will be evident to a person of skill in the art that this is an example only, and that the fault injection test record may take any suitable form. It can also be seen that each fault injection test is assigned a unique ID which, in this example, reflects the order in which the fault injection tests were performed.

In some cases, the fault injection test record, and entries thereof, may be stored in a database to allow the entries to be easily searched and analysed. Once the results of the fault injection test have been saved in memory (e.g. added to the fault injection test record) the method 100 proceeds to block 116.

At block 116, a determination is made as to whether another fault injection test is to be performed based on the fault injection tests performed up to this point. Preferably, as many fault injection tests are performed as possible so as to test as many fault nodes as possible. However, as described above, due to the large number of fault nodes in a complex hardware design, testing all of the fault nodes in a complex hardware design is generally not feasible and/or practicable. In some cases, the determination of whether another fault injection test is to be performed may be based on one or more of: the number of fault injection tests performed for each fault node group; the amount of time elapsed since beginning the fault injection testing or fault injection campaign; the percentage of total fault nodes in the final fault node list that have been tested at least once (which may be referred to as the fault node coverage); and/or other coverage metrics. For example, fault injection tests may continue to be performed until a desired number of fault injection tests (e.g. 1,000) have been performed for each fault node group.

If it is determined that another fault injection test is to be performed, the method 100 proceeds back to block 108 where the parameters for another fault injection test are determined and a simulation of the hardware design is run with a fault injected therein in accordance with the selected parameters. If, however, it is determined that another fault injection test is not to be performed, then the method 100 may end or the method 100 may proceed to block 118.

At block 118, the results of the fault injection testing (e.g. the fault injection test record) may be analysed to determine or evaluate the success of the fault injection testing (e.g. fault campaign). This may comprise generating one or more metrics from the results of the fault injection testing (e.g. the fault injection test record). One of the benefits of storing the fault injection test results in a fault injection test record as described above is that many different metrics suitable for different testing intents and goals may be generated.

For example, as shown in FIG. 4, per fault node group metrics 400 may be generated. The per fault node group metrics may include, but are not limited to, the percentage of detected faults, the percentage of safe faults, the percentage of potentially unsafe faults, and the percentage of potentially unsafe lockup faults. Other per fault node group metrics which may be generated include, but are not limited to, the percentage of the fault nodes in the fault node group that were tested. In some cases, metrics for each failure mode may be generated by combining the metrics for the related fault node groups. For example, metrics for each failure mode may be generated to be an average of the corresponding metrics for the related fault node groups. For example, the percentage of detected faults for the first failure mode (FM1) of FIG. 4 which is associated with two fault node groups (FG1 and FG2) may be generated as the average of the percentage of the detected faults for FG1 and the percentage of the detected faults for FG2. In some cases, the failure mode metrics may be generated as a weighted average. In these cases, a weight may be assigned to each fault node group associated with the failure mode. In a similar manner, per fault node metrics may be generated and the per fault node group metrics may be generated from the fault node metrics for the fault nodes in that fault node group. The fault node group metrics may be generated from the fault node metrics in any suitable manner—e.g. average, weighted average etc.

The metrics that are generated, may be based on the design goals and the intent of the fault injection testing. For example, the intent of the fault injection testing or campaign may be to satisfy International Organization for Standardization (ISO) 26262 ("Road vehicles—Functional safety") ASIL A/B/C/D. ISO 26262 is an international standard for functional safety of electrical and/or electronic systems in production automobiles. ISO 26262 is a risk-based safety standard, where the risk of a hazardous operational situation is qualitatively assessed and safety measures are defined to avoid or control systemic failures and to detect and control random hardware failures, or mitigate their effects. ISO 26262 Automotive Safety Integrity Level (ASIL) is a risk classification scheme defined by ISO 26262. ASILs establish safety requirements based on the probability and acceptability of harm. There are four ASILs identified by ISO 26262—A, B, C and D. ASIL A represents the lowest degree and ASIL D represents the highest degree of hazard. Different components of a vehicle require different ASIL levels. An ASIL for an electronic component is established by performing hazard analysis and risk assessment. Determining whether a component satisfies a particular ASIL level requires determining three metrics: Failure-in-Time (FiT), single point fault (SPF) which is a measurement of SPF coverage, and latent fault metric (LFM) which is a measurement of latent fault coverage. These metrics may also be used to measure the success of the fault injection testing or the fault campaign. It will be evident to a person of skill in the art that this is an example only and the fault injection testing described herein may be performed for another purpose or intent.

In some cases, the method 100 of FIG. 1 may be performed after systematic or functional verification of the hardware design has been performed. As described above, systematic, or functional, verification may be performed via simulation-based verification and/or formal property verification. Where the systematic verification is performed at least partially via simulation-based verification, the same testbench (i.e. same sets of stimuli or tests) and simulation tool that were used in the simulation-based verification may be used in block 110 of the method 100 of FIG. 1. This helps to ensure that the quality of capturing random faults is aligned with the quality of testing systematic faults.

The method 100 may be used to perform fault injection testing at any level of abstraction of a hardware design. For example, the method 100 may be used to perform fault injection testing at the RTL level or at the gate level. However, it is noted that it may be more difficult to identify the fault node groups at the gate level than at the RTL level. The inventors have identified that some synthesis tools (i.e. a tool that can produce a netlist from RTL code) may not always produce the same netlist for the same RTL code. In other words, different synthesis runs on the same RTL code may produce different netlists. Accordingly, a netlist may not always be fully reproducible. Accordingly, if the fault injection testing is performed at gate level the fault node identification and the fault injection testing should, preferably, be performed on the same synthesis run. In some cases, performing fault injection testing for a hardware design for a complex component, such as a graphics processing unit (GPU), may comprise performing a portion of the fault injection testing at the RTL level and performing a portion of the fault injection testing at the gate level. For example, some safety mechanisms, such as, but not limited to, an error correction code (ECC), may be able to be tested at the module level allowing for RTL level fault injection testing whereas other safety mechanisms, such as, but not limited to, dual lockstep processing may only be able to be tested at the system level which may be tested more efficiently at the gate level.

Generating the Raw Fault Node List

Where the hardware design under test is in a high-level hardware description language, such as an RTL language, the raw fault node list may, in some cases, be generated from toggle coverage information generated for a simulation of the hardware design. Toggle coverage is a measure of how many, or what percentage, of the bits of the signals and/or ports of a hardware design have toggled from zero to one (0→1) and back (1→0) during a simulation. A toggle coverage of 100% means that every bit of every signal and/or port has changed its value from 0 to 1 and from 1 to 0. Toggle coverage may be used to assess the stimuli quality for a simulation. If a signal or a bit thereof is not toggled from 0 to 1, or from 1 to 0, it may be considered not to have been adequately tested. Accordingly, in some cases, the higher the toggle coverage, the better the quality of the stimuli.

The toggle coverage for a simulation is generated from toggle coverage information that describes which bits of each signal and/or port in the hardware design were changed from zero to one (0→1) and back (1→0). Toggle coverage information generally comprises information identifying each signal and/or port in the hardware design (e.g. the location (hierarchical path thereof)) and whether or not the signal or port (or each bit of the signal or port) has been toggled in both directions. The toggle coverage information may also comprise information indicating how many times a signal or port was toggled.

Many simulation tools are able to generate toggle coverage information for a simulation of a hardware design by monitoring the signals and ports of the hardware design during the simulation. For example, in some simulation tools toggle coverage monitoring is a feature that can be enabled or disabled for a simulation; and when enabled, the simulation tool monitors the signals and ports of the hardware design during the simulation for toggle coverage. In some cases, the toggle coverage information generated by a simulation tool may be output in the form of a toggle coverage report. For example, the toggle coverage information generated by a simulation tool may be provided to a report generator which may generate a toggle coverage report therefrom. The report generator may form part of the simulation tool or may be separate from the simulation tool. For example, Synopsys® VCS® simulation tool includes a Unified Report Generator (URG) which can be used to generate coverage reports, such as a toggle coverage report. A toggle coverage report may present toggle coverage information in a human-readable format. In some cases, the toggle coverage report may be in a text (txt) file format or a hypertext markup language (html) file format, however, it will be evident to a person of skill in the art that these are example formats only. The structure of the toggle coverage information and/or the toggle coverage report may vary between simulation tools.

Reference is now made to FIG. 5 which shows an excerpt from an example toggle coverage report 500 generated by the Synopsys® VCS® simulation tool. This example excerpt shows toggle coverage information for a module named "PVRLIB.IMG_ROUND_ROBIN_INEX_ARCH1". It can be seen that the excerpt identifies the location or hierarchical path of the instance of this module as "rgx_tdm_tb_tip.0 dut.I_RGX_TDM_CONTROLLIMG_ROUND_ROBIN_INDEX_ARCH1_MISSION_ENABLED_CLUSTERS". Specifically, this is the location of the instance of this module during simulation, and thus this path can be provided to the simulation tool to identify the module. The excerpt also identifies the toggle elements (e.g. signals, ports, registers) of that module/instance. Specifically, in the example excerpt of FIG. 5 there are seven toggle elements—VALIDS, PREVIOUS_INDEX, NEXT_INDEX, FAIL SIGNAL, ASSERT_INPUTS_OK, ASSERT_INDEX_LESS_THAN_WIDTH and ASSERT_PREV_INDEX_DISABLE".

Since toggle coverage information comprises information identifying each signal and/or port in a hardware design, a complete list of the signals and/or ports in the hardware design may be generated from the toggle coverage information. Accordingly, in some cases, the raw fault node list may be generated by parsing the toggle coverage information (e.g. a toggle coverage report). Specifically, the toggle coverage information (e.g. toggle coverage report) may be parsed to extract each signal and/or port identified in the toggle coverage information and the location thereof in the hardware design. A fault node entry may then be generated in the raw fault node list for each signal and/or port identified therein that identifies the signal and/or port and the location thereof in the hardware design.

For example, for a toggle coverage report 500 in the format shown in FIG. 5 the raw fault node list may be generated by: when the text "ModuleName" is encountered, recording the location associated with the module name (i.e. the text following the phrase "Instance") as the current location or path; and when the text "toggle" is encountered, creating a new fault node entry for the toggle element identified thereby with the current location or path. Accordingly, the path for the most recent module identified in the toggle coverage report remains the current path until the next module is identified, at which point the path associated with the next module becomes the current path. It will be evident to a person of skill in the art that this is an example only and that the method in which the toggle coverage information is parsed to identify the fault nodes for a hardware design will vary based on the format of the toggle coverage information (e.g. toggle coverage report).

As described in more detail below, the generation of the raw fault node list from toggle coverage information may be performed by a toggle coverage parser. Specifically, the toggle coverage parser is a software component that is configured to receive toggle coverage information in a predetermined format; extract the toggle elements identified therein; and generate a raw fault node list by adding a fault node entry to the raw fault node list for each identified toggle element.

While a raw fault node list generated from toggle coverage information as described herein may be used in the method 100 of FIG. 1, a raw fault node list generated in this manner may also be used in other fault injection methods. In other words, a raw fault node list generated from toggle coverage information is not limited to use in the method 100 of FIG. 1 where the fault nodes are grouped into fault node groups.

Where the raw fault node list is generated from toggle coverage information generated from a simulation of the hardware design, then preferably the same test bench and simulation tool are used for both the generation of the toggle coverage information and the fault injection testing.

System

Figure 6:
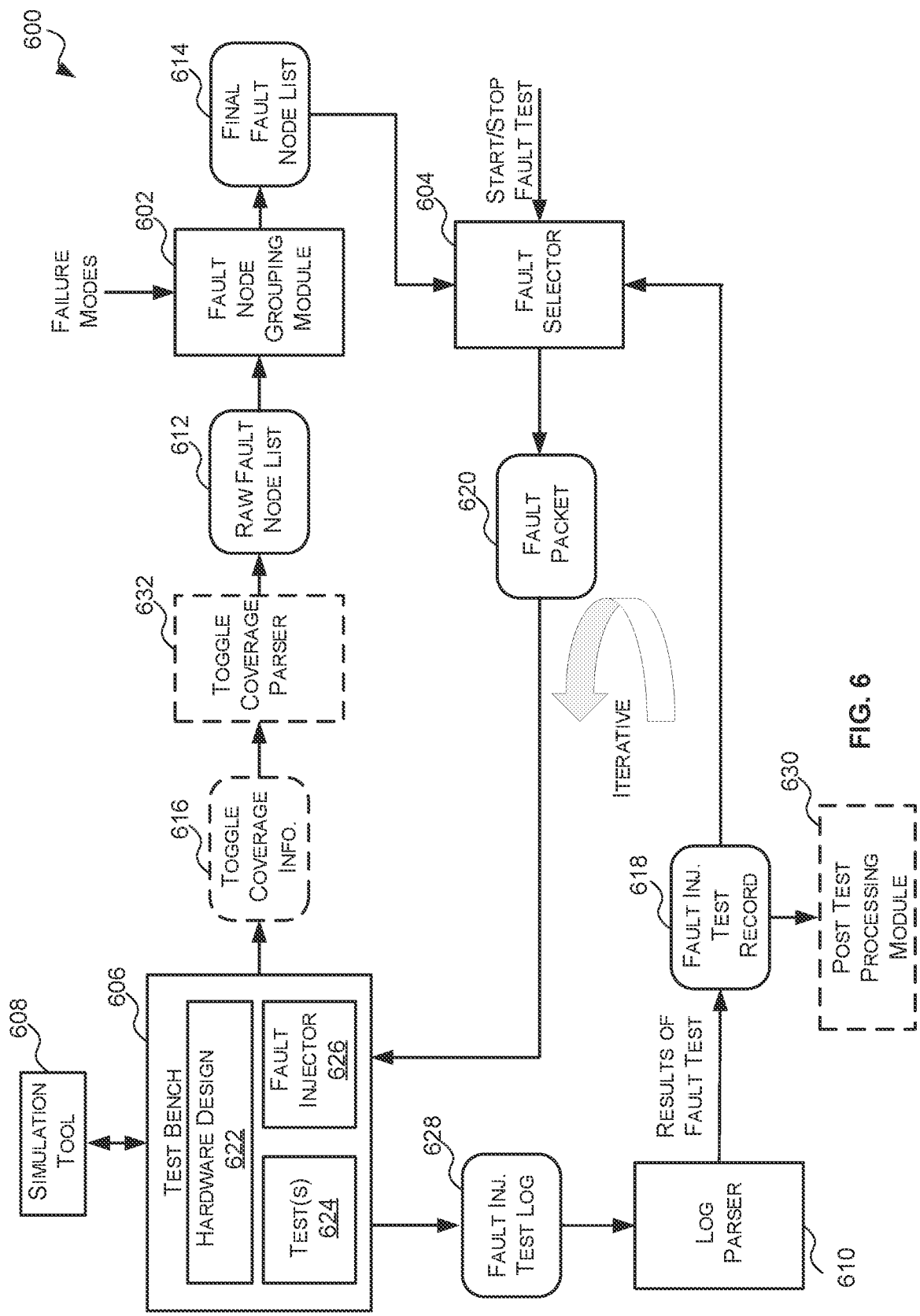
FIG. 6 is a block diagram of an example system for implementing the method of FIG. 1.

Reference is now made to FIG. 6 which illustrates an example system 600 for performing fault injection testing on an integrated circuit hardware design in accordance with the method 100 of FIG. 1 where the fault nodes of the hardware design are grouped into fault node groups. All or a portion of the components of the system 600 of FIG. 6 may be implemented by a computing-based device such as the computing-based device 700 described below with respect to FIG. 7. For example, there may be a computer readable storage medium having stored thereon computer readable instructions that, when executed at a computing-based device, cause the computing-based device to perform the functions of one or more of the components of the system 600 of FIG. 6.

The system 600 of FIG. 6 comprises a fault node grouping module 602, a fault selector 604, a test bench 606, a simulation tool 608 and a log parser 610.

The fault node grouping module 602 is a software tool that is configured to receive a raw fault node list 612 for the hardware design under test and a set of failure modes to be tested, and generate a final fault node list 614 therefrom. The final fault node list comprises a list of fault nodes of the hardware design which may be faulted during a fault campaign. As described above, the raw fault node list 612 comprises a list of fault nodes in the hardware design under test. The raw fault node list 612 may be generated in any suitable manner. For example, as described above, the raw fault node list 612 may be generated from toggle coverage information 616 generated for a simulation of the hardware design under test. The set of failure modes of the hardware design to be tested may be generated in any suitable manner. For example, the failure modes to be tested may be generated in accordance with an FMEA technique or process.

In the examples described herein, the final fault node list 614 is generated from the raw fault node list 612 by grouping the fault nodes in the raw fault node list 612 into fault node groups based on the failure modes to be tested, and generating the final fault node list 614 based on the groupings. As described above, a fault node group comprises fault nodes that have the same effect on a failure mode. In some cases, the grouping of fault nodes in the raw fault node list into fault node groups may be performed manually by a user (e.g. a verification engineer). In these cases, the fault node grouping module 602 may be configured to receive input from a user indicating which fault nodes in the raw fault node list 612 form a fault node group. For example, the fault node grouping module 602 may be configured to present a graphical user interface, or the like, to the user which allows the user to view the fault nodes in the raw fault node list and the failure modes, and group the fault nodes into fault node groups by providing user input. As described above, each fault node in the raw fault node list 612 may belong to none, one or more than one fault node group. In some cases, the fault node grouping module 602 may be configured to automatically assign a unique identifier (e.g. number) to each fault node group identified by the user. Alternatively, or additionally the fault node grouping module 602 may be configured to allow the user to assign an identifier to one or more fault node groups. The fault node grouping module 602 may also be configured to receive input from a user indicating the failure mode that each fault node group is associated with.

Once the fault node grouping module 602 has received input identifying the fault node groups and the fault nodes that form each group, the fault node grouping module 602 may be configured to generate the final fault node list 614 based on the groupings. For example, in some cases, the final fault node list 614 may comprise all the fault nodes in the raw fault node list 612 that form part of at least one fault node group. In some cases, the final fault node list 614 may comprise an entry for each fault node that forms part of the final fault node list 614. As described above, each entry may identify the fault node and the fault node group(s) that the fault node belongs to. The information identifying a fault node may comprise a location (e.g. hierarchical path) to the fault node in the hardware design. In some cases, each entry may comprise additional information. For example, in some cases, each entry may further comprise information indicating whether the fault node is mission logic or safety logic and/or information identifying the failure mode(s) that the fault node is associated with.

The fault selector 604 is a software tool configured to select the parameters for a fault injection test based on the final fault node list 614. Selecting the parameters for a fault injection test may comprise: (i) randomly, or pseudo randomly, selecting a fault node group; (ii) randomly, or pseudo randomly, selecting one or more fault nodes in the selected fault node group; and (iii) randomly, or pseudo randomly, selecting one or more fault parameters such as, but not limited to, the time of the fault injection, the length of the fault injection, and whether faulting a fault node sets the fault node to a "1" or a "0".

The number of fault nodes that are selected by the fault selector 604 from the selected fault node group may be based on the type of fault test. For example for a single point fault test a single fault node from the selected fault node group may be selected, and for a dual point fault test two fault nodes from the selected fault node group may be selected. In some cases, for a dual point fault test, one fault node associated with mission logic is selected and one fault node associated with safety logic is selected. In some cases, the fault selector 604 may be configured to receive input from a user indicating which type of fault test is to be performed (e.g. single point fault, dual point fault etc.)

As described above, in some cases, the fault selector 604 may be configured to randomly, or pseudo randomly, select a fault node group in a manner that gives preference to the fault node groups that have been tested the fewest number of times. In some cases, the fault selector 604 may be configured to randomly, or pseudo randomly, select a fault node from a selected fault node group in a manner that gives preference to the fault nodes in the selected fault node group that have been tested the fewest number of times (or have not been tested at all). As described above, the fault selector 604 may be configured to analyse the fault injection test record 618 to determine the fault node groups and/or fault nodes that have been tested the fewest number of times. The fault injection test record is described below.

Once the fault selector 604 has selected the parameters for a fault injection test, the fault selector 604 may be configured to output information identifying the selected parameters. In some cases, the fault selector 604 may be configured to output the information identifying the selected parameters in the form of a fault packet 620. In some cases, the information identifying the selected fault injection parameters (e.g. fault packet 620) may be provided to the test bench 606 which triggers a fault injection simulation test to be performed with a fault in accordance with the selected parameters.

In some cases, the fault selector 604 may be configured to select a new set of fault injection test parameters in response to receiving input that a fault injection test is to be performed. For example, a user may provide input to the fault selector 604 to initiate a fault campaign which causes the fault selector 604 to select a set of fault injection test parameters. Then, after each fault injection test, a decision may be made (automatically or manually) as to whether another fault injection test is to be performed. If another fault injection test is to be performed, then the fault selector 604 is notified which causes the fault selector 604 to select another set of fault injection test parameters.

The test bench 606 describes the environment in which a simulation of the hardware design is to be performed. The test bench 606 comprises the hardware design 622 under test (or information identifying the hardware design under test); one or more tests 624 (or information identifying the one or more sets of stimuli); and a fault injector 626. The hardware design 622 may be at any suitable level of abstraction—e.g. RTL or gate level (e.g. a netlist). Each test 624 may be identified by a set of commands, or a script, which, when executed by the simulation tool 608, causes the simulation tool 608 to mimic the behaviour of the hardware design in response to the stimuli. The test bench 606 may also, in some cases, comprise a reference model of the hardware design (not shown) and the selected stimuli may also be applied to the reference model.

The fault injector 626 is a software tool configured to receive information (e.g. a fault packet 620) identifying the fault injection test parameters selected by the fault selector 604 and cause a fault to be injected into the simulation in accordance with the identified parameters. The fault injector 626 may be able to cause a fault to be injected into the simulation by generating instructions or commands, which, when executed by the simulation tool 608, cause the simulation tool to inject a fault into one or more desired fault nodes at run-time. The commands may identify the fault node(s) to be faulted (e.g. the location or path of the fault node), the time at which the fault node(s) is/are to be faulted, the length of the fault, and how the fault node(s) is/are to be faulted (e.g. set to '0' or '1').

The fault injector 626 may also be configured to cause the simulation tool 608 to stop the simulation if one or more simulation stop conditions occur during the simulation. The simulation stop conditions may include, after the fault has been injected into the simulation: (i) the relevant safety mechanism (i.e. the safety mechanism associated with the failure mode being tested) detecting the fault; (ii) a fatal and/or non-fatal error occurring during the simulation; and/or (iii) a certain number of cycles (e.g. clock cycles) elapsing.

The simulation tool 608 is a software tool configured to simulate a hardware design. The simulation tool 608 may be any known software tool configured to simulate a hardware design at the desired level. The simulation tool 608 is configured to receive from the test bench 606, information identifying: the hardware design under test, the stimuli to be applied to the hardware design (e.g. information identifying the test to be run), and the elements of the hardware design to be monitored. The simulation tool then mimics the behaviour of the hardware design in response to the specified stimuli. The simulation tool 608 is also configured to receive information identifying a fault to be injected into the simulation (e.g. fault injection commands) from the fault injector 626 and insert a fault into the simulation at run-time in accordance therewith; and receive information identifying the simulation stop conditions and stop the simulation if one of the identified simulation stop conditions occurs during the simulation. Once a stop condition has occurred the simulation tool 608 may output a fault injection test log 628 which provides information on the state of the monitored elements during the simulation and/or errors detected therein. The fault injection test log 628 may be provided to the log parser 610 for analysis.

The log parser 610 is a software tool configured to analyse the fault injection test log 628 to identify the result(s) of the fault injection test and store the results in memory. The result of a fault injection test may be based on: whether the fault was detected by a safety mechanism/safety logic during the simulation; whether an error occurred as a result of the fault; and/or whether no error occurred, and the simulation was stopped for another reason (e.g. timeout). For example, as described above, the result of a fault injection test may be determined to be one of: DETECTED FAULT, SAFE FAULT, POTENTIALLY UNSAFE FAULT, or POTENTIALLY UNSAFE LOCKUP FAULT. In some cases, the log parser 610 may be configured to search the fault injection test log 628 for information (e.g. a signature) indicating what, if any, errors occurred during the simulation, and for information indicating that the error was detected by the relevant safety mechanism. The log parser 610 may then be configured to determine the result of the fault injection test based on the located information.

Once the log parser 610 has identified the result of the fault injection test, the log parser 610 is configured to store the result of the fault injection test in memory. In some cases, the result of the fault injection test may be stored in a fault injection test record 618. In some cases, there may be an entry in the fault injection test record 618 for each fault injection test performed during a fault campaign. In these cases, storing the result of the fault injection test may comprise adding an entry to the fault injection test record 618 indicating the results thereof. Each entry may also comprise other information describing the fault injection test such as, but not limited to, the fault node(s) that were faulted, the fault node group that the fault node(s) belong to, the failure mode that the fault node group relates to, and/or the set of stimuli (e.g. the test) used for the simulation etc. An example fault injection test record 618 was described with respect to FIG. 3.

As described above, in some cases, once the fault injection testing is complete the results of the fault injection tests (e.g. fault injection test record 618) may be further processed to analyse the performance of the fault injecting testing. In these cases, the system 600 may further comprise a post test processing module 630 which is a software tool configured to (or configurable to) analyse the results of the fault injection testing. In some cases, the post test processing module 630 may be configured to, or may be configurable to, generate one or more metrics from the fault injection testing results (e.g. fault injection test record 618). The metrics that are generated may be based on the intent or purpose of the fault injection testing. Example metrics which may be generated therefrom were described above.

As described above, in some cases, the raw fault node list 612 may be generated from toggle coverage information 616 generated during a simulation of the hardware design under test. The toggle coverage information may have been generated from the same test bench 606 and simulation tool 608 used for fault injection testing. In these cases, the system 600 may also comprise a toggle coverage parser 632 which is a software tool configured to identify the toggle elements of a hardware design from the toggle coverage information 616 and generate the raw fault node list therefrom. For example, in some cases, the toggle coverage parser 632 may be configured to create a fault node entry in the raw fault node list for each toggle element identified in the toggle coverage information.

It will be evident to a person of skill in the art that the system 600 of FIG. 6 is merely an example and the method 100 of FIG. 1 may be implemented in another manner.

Figure 7:
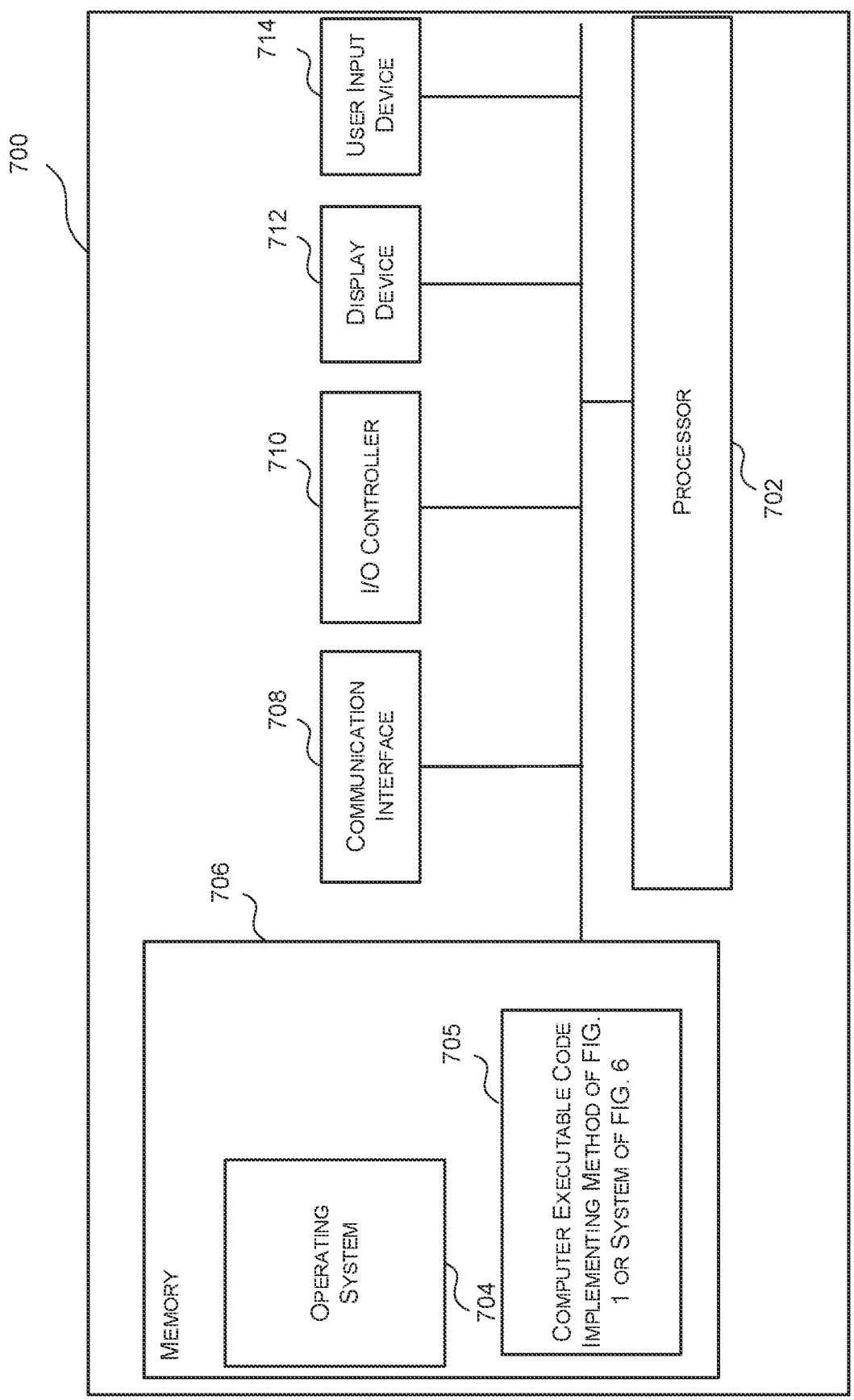
FIG. 7 is a block diagram of an example computing-based device which may be used to implement the methods and systems described herein.

FIG. 7 illustrates various components of an exemplary general purpose computing-based device 700 which may be implemented as any form of a computing and/or electronic device, and in which all or a portion of the method 100 of FIG. 1 or the system 600 of FIG. 6 described above may be implemented.

Computing-based device 700 comprises one or more processors 702 which may be microprocessors, controllers or any other suitable type of processors for processing computer executable instructions to control the operation of the device in order to assess the performance of an integrated circuit defined by a hardware design in completing a task. In some examples, for example where a system on a chip architecture is used, the processors 702 may include one or more fixed function blocks (also referred to as accelerators) which implement a part of the method of, or system for, performing fault injection testing on an integrated circuit hardware design. Platform software comprising an operating system 704 or any other suitable platform software may be provided at the computing-based device to enable application software, such as computer executable code 705 for implementing at least a portion of the method 100 of FIG. 1 or the system 600 of FIG. 6, to be executed on the device.

The computer executable instructions may be provided using any computer-readable media that is accessible by computing-based device 700. Computer-readable media may include, for example, computer storage media such as memory 706 and communications media. Computer storage media (i.e. non-transitory machine readable media), such as memory 706, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 706) is shown within the computing-based device 700 it will be appreciated that the storage may be distributed or located remotely and accessed via a network or other communication link (e.g. using communication interface 708).

The computing-based device 700 also comprises an input/output controller 710 arranged to output display information to a display device 712 which may be separate from or integral to the computing-based device 700. The display information may provide a graphical user interface. The input/output controller 710 is also arranged to receive and process input from one or more devices, such as a user input device 714 (e.g. a mouse or a keyboard). In an embodiment the display device 712 may also act as the user input device 714 if it is a touch sensitive display device. The input/output controller 710 may also output data to devices other than the display device, e.g. a locally connected printing device (not shown in FIG. 7).

The system 600 of FIG. 6 is shown as comprising a number of functional blocks or units. This is schematic only and is not intended to define a strict division between different logic elements of such entities. Each functional block or unit may be provided in any suitable manner. It is to be understood that intermediate values described herein as being formed by a block or unit need not be physically generated by the system at any point and may merely represent logical values which conveniently describe the processing performed by the system between its input and output.

The system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

There may be provided a computer readable storage medium having encoded thereon an integrated circuit hardware design that has been tested in accordance with a method and/or system described herein that when processed (i.e. run) in an integrated circuit manufacturing system configures the system to manufacture the integrated circuit.

An integrated circuit hardware design, which may also be referred to as an integrated circuit definition dataset, may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an integrated circuit will now be described with respect to FIG. 8.

Figure 8:
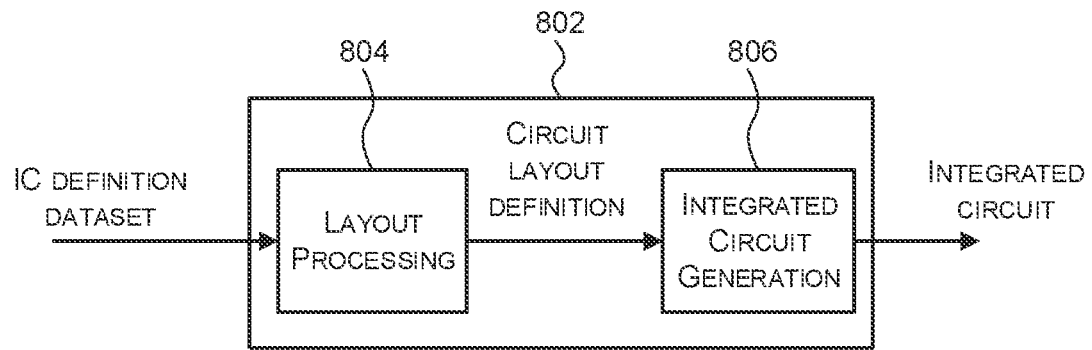
FIG. 8 is a block diagram of an example integrated circuit manufacturing system for generating an integrated circuit from an integrated circuit hardware design.

FIG. 8 shows an example of an integrated circuit (IC) manufacturing system 802 which is configured to manufacture an integrated circuit from an integrated circuit hardware design that has been tested in accordance with a method or system described herein. In particular, the IC manufacturing system 802 comprises a layout processing system 804 and an integrated circuit generation system 806. The IC manufacturing system 802 is configured to receive an IC definition dataset that has been tested in accordance with a method or system described herein, process the IC definition dataset, and generate an IC according to the IC definition dataset. The processing of the IC definition dataset configures the IC manufacturing system 802 to manufacture the integrated circuit.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an integrated circuit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of performing fault injection testing on a register transfer level integrated circuit hardware design, the method comprising:
   (a) receiving a raw fault node list identifying one or more fault nodes of the register transfer level integrated circuit hardware design;
   (b) receiving information indicating a grouping of the one or more fault nodes in the raw fault node list into a plurality of fault node groups, each fault node group comprising fault nodes that have a same effect on a failure mode of the register transfer level integrated circuit hardware design;
   (c) generating a final fault node list based on the plurality of fault node groups;
   (d) selecting a set of fault injection parameters for a fault injection test based on the final fault node list, the set of fault injection parameters identifying at least one fault node in the final fault node list to fault;
   (e) performing the fault injection test on the register transfer level integrated circuit hardware design by causing a fault to be injected into a simulation of the register transfer level integrated circuit hardware design in accordance with the selected set of fault injection parameters;
   (f) determining a result of the fault injection test;
   (g) storing the result of the fault injection test; and
   repeating (d) to (g) at least once.

2. The method of claim 1, wherein selecting a set of fault injection parameters comprises selecting a fault node group of the plurality of fault node groups and selecting one or more fault nodes from the selected fault node group.

3. The method of claim 2, wherein the one or more fault nodes of the selected fault node group are selected such that fault nodes of the selected fault node group that have not been selected for a fault injection test are more likely to be selected than fault nodes of the selected fault node group that have already been selected for a fault injection test.

4. The method of claim 3, wherein selecting a set of fault injection parameters for a fault injection test further comprises determining from the results of the fault injection tests which fault nodes of the selected fault node group have not yet been selected for a fault injection test and randomly selecting one of the fault nodes of the selected fault node group which has not yet been selected for a fault injection test.

5. The method of claim 2, wherein the fault node group of the plurality of fault node groups is selected such that the fewer times a fault node group has been selected for a fault injection test the more likely the fault node group is to be selected.

6. The method of claim 2, wherein when the fault injection test is a single point fault test, selecting one or more fault nodes from the selected fault node group comprises selecting a single fault node from the selected fault node group.

7. The method of claim 2, wherein:
   each fault node group is associated with a failure mode;
   each failure mode is associated with a safety mechanism that is implemented in the register transfer level integrated circuit hardware design; and
   when the fault injection test is a dual point fault test, selecting one or more fault nodes of the selected fault node group comprises selecting a first fault node of the selected fault node group that forms part of safety logic that implements the safety mechanism for the associated failure mode and a second fault node that does not form part of the safety logic that implements the safety mechanism for the associated failure mode.

8. The method of claim 2, wherein selecting a set of fault injection parameters further comprises selecting one or more of: a time at which the fault is to be injected, a duration of the fault, and whether the fault is a 0 or a 1.

9. The method of claim 1, further comprising generating the raw fault node list from toggle coverage information for a simulation of the register transfer level integrated circuit hardware design.

10. The method of claim 9, wherein the toggle coverage information identifies one or more toggle elements and generating the raw fault node list from the toggle coverage information comprises adding each toggle element identified in the toggle coverage information to the raw fault node list as a fault node.

11. The method of claim 9, further comprising generating the toggle coverage information from a simulation of the register transfer level integrated circuit hardware design.

12. The method of claim 1, wherein each fault node in the raw fault node list forms part of none, one or more than one fault node group, and generating the final fault node list from the plurality of fault node groups comprises adding each fault node that forms part of at least one fault node group to the final fault node list.

13. The method of claim 1, wherein the final fault node list comprises an entry for each fault node in the final fault node list, each entry in the final fault node list comprising information identifying a fault node and information identifying one or more fault node groups of which the fault node forms a part.

14. The method of claim 13, wherein each failure mode is associated with a safety mechanism that is implemented in the register transfer level integrated circuit hardware design, and each entry in the final fault node list further comprises information identifying the failure mode associated with the one or more fault node groups that the fault node forms part of and/or for each fault node group that the fault node forms part of information indicating whether the fault node forms part of safety logic that implements the safety mechanism for the failure mode associated with that fault node group.

15. The method of claim 1, further comprising causing the simulation to stop when one of a plurality of simulation stop conditions occurs during the simulation, the plurality of simulation stop conditions comprise one of more of: an error occurring in the simulation after the fault is injected therein; a safety mechanism implemented by the register transfer level integrated circuit hardware design detecting the fault; and a predetermined number of cycles elapsing since the fault was injected into the simulation.

16. The method of claim 1, wherein determining the result of a fault injection test comprises analysing a fault injection test log generated during the simulation.

17. The method of claim 1, wherein:
   each fault injection test is associated with a failure mode;
   each failure mode is associated with a safety mechanism that is implemented in the register transfer level integrated circuit hardware design; and
   determining the result of a fault injection test comprises determining if, after the fault was injected into the simulation, the safety mechanism associated with the fault injection test detected the fault and determining if, after the fault was injected into the simulation an error occurred in the simulation.

18. The method of claim 1, further comprising generating one or more safety metrics from the results of the fault injection tests.

19. A system to perform fault injection testing on a register transfer level integrated circuit hardware design, the system comprising:
- a fault node grouping module configured to:
  - receive a raw fault node list identifying one or more fault nodes of the register transfer level integrated circuit hardware design,
  - receive information indicating a grouping of the fault nodes in the raw fault node list into a plurality of fault node groups, each fault node group comprising fault nodes that have a same effect on a failure mode of the register transfer level integrated circuit hardware design, and
  - generate a final fault node list based on the fault node groups;
- a fault selector configured to, for each of a plurality of fault injection tests, select a set of fault injection parameters based on the final fault node list, the set of fault injection parameters identifying at least one fault node in the final fault node list to fault;
- a fault injector configured to, for each of the plurality of fault injection tests, cause a fault injection test to be performed on the register transfer level integrated circuit hardware design by causing a fault to be injected into a simulation of the register transfer level integrated circuit hardware design in accordance with the selected set of fault injection parameters; and
- a log parser configured to, for each of the plurality of fault injection tests, determine a result of the fault injection test and store the result of the fault injection test.

20. A non-transitory computer readable storage medium having stored thereon computer readable instructions that, when executed at a computer system, cause the computer system to perform the method as set forth in claim 1.

* * * * *